Jan. 31, 1967 F. L. TURBETT 3,301,640
PROCESS OF PRODUCING STOICHIOMETRIC URANIUM DIOXIDE
Original Filed Oct. 27, 1959
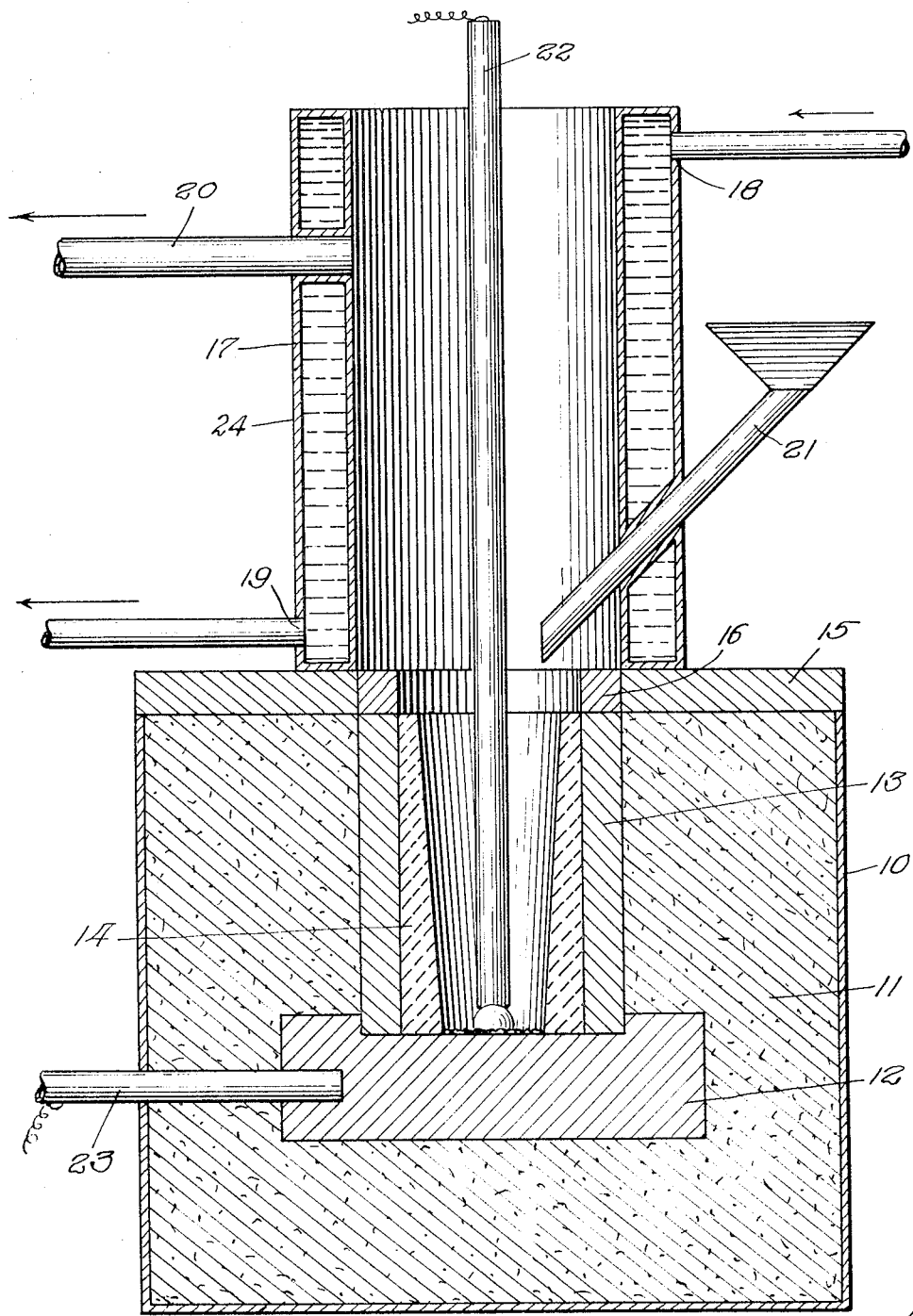
Inventor:
Forrest L. Turbett,
By Merriam, Smith & Marshall,
Attys.

United States Patent Office 3,301,640
Patented Jan. 31, 1967

3,301,640
PROCESS OF PRODUCING STOICHIOMETRIC
URANIUM DIOXIDE
Forrest L. Turbett, Phoenix, Ariz., assignor, by mesne assignments, to Kerr-McGee Corporation, a corporation of Delaware
Continuation of application Ser. No. 848,954, Oct. 27, 1959. This application Aug. 5, 1963, Ser. No. 302,762
14 Claims. (Cl. 23—355)

This application is a continuation of my copending application Serial No. 848,954, filed October 27, 1959, for "Process of Producing Stoichiometric Uranium Dioxide," now abandoned.

This invention relates to the production of uranium dioxide. More particularly, this invention is concerned with a process of producing a stoichiometric uranium dioxide having an extremely high density and purity.

Uranium dioxide has a theoretical density of 10.97 grams per cubic centimeter. It is important that the uranium dioxide in reactor fuel elements be as close to theoretical density, and stoichiometric composition, as possible because of space and heat conductivity problems. The higher density fuel uses less space than the lower density material. This is a significant factor in reactor design. Also, as uranium dioxide approaches the stoichiometric form its heat conductivity increases. This is important because it allows the heat of fission within the fuel element to pass more rapidly to the surrounding medium, thereby increasing efficiency and preventing excessive buildup of heat within the fuel element.

Fuel elements for reactors are often produced by sintering ceramic grade uranium dioxide previously pressed into the desired form. This process involves a large amount of waste because of warping of the fuel elements and inability to produce sintered products of constant density.

Because of the difficulties encountered with sintering, swaging has been employed for producing reactor fuel elements. In this process, the uranium dioxide is placed into a pipe and subjected to immense pressures through reduction of the pipe size. The density of the uranium dioxide after swaging depends to a large extent upon the particle density before swaging so that high density material must be used. This is in contradistinction to the sintering process in which the final density is governed by the conditions of sintering, and is often raised above that of the unsintered ceramic grade material. There is thus a need for uranium dioxide of high particle density.

According to the present invention there is provided a novel process of producing uranium dioxide of essentially stoichiometric density. This process comprises heating a uranium compound decomposable by heat into uranium dioxide until it melts, maintaining the uranium material at such temperature for a short time thereafter and rapidly cooling the resulting uranium dioxide in an atmosphere which is essentially nonoxidizing to the hot fused uranium dioxide. The cooled fused uranium dioxide then may be crushed, washed and dried.

Melting of the uranium feed material is advisably effected by an electric arc formed by a graphite electrode and the compound to be fused.

The invention will now be described in conjunction with the attached drawing in which the figure is an electric arc furnace used in the subject invention. The furnace has a steel shell 10 containing insulating refractory material 11 such as magnesite. A graphite plate 12 (10" diameter and 3" high) is placed on a layer of magnesite in the bottom of the furnace. A graphite cylinder (6¼" diameter and 1" thick) is centrally positioned with the bottom resting on the graphite plate 12. A slightly internally tapered graphite cylinder shell 14 (4.25" top diameter; 4" bottom diameter and 1" thick at the bottom) is fitted into cylinder shell 13 so that its bottom also rests on the graphite plate. The upper surface of the magnesite is covered with furnace brick 15 and high temperature alumina cement 16 used to hold the cylinder 13 and fire brick 15 in place.

The furnace is provided with a hood 24 for exhausting gaseous reaction products and recovering uranium therefrom. The hood has hollow cylindrical jacket 17 through which water enters at 18 and is removed at 19. Conduit 20 is connected to a vacuum line which leads to a filter. This serves to remove fumes released in the process without loss of uranium. Feed tube 21 is used to feed the uranium feed compound into the furnace. Graphite rod 22 is an electrode, advisably the cathode, and graphite rod 23 is the other electrode, advisably the anode.

In practicing this invention using an electric arc furnace, such as described, a layer of the uranium feed material is first placed on the bottom of the furnace. The uranium compound that is fed to the high temperature zone can be any compound of uranium that has sufficient oxygen to form stoichiometric uranium dioxide. Examples of such compounds which can be used are ceramic grade uranium dioxide, $UO_3$, $UO_4$, $U_3O_8$ and ammonium diuranate. Alternately, any uranium compound can be used if oxygen is supplied so as to allow the formation of $UO_2$ and the compound decomposes at the temperature used. The material to be fused is conveyed through feed tube 21 by gravity and it falls through the water-cooled hood 24 into the area of the electric arc. The arc is first formed between the graphite electrode 22 and the inner wall 14 of the graphite furnace. As the starting layer of the feed material is heated it becomes a conductor and the electrode then can be moved away from the wall since the arc is maintained between the electrode and the feed material. At this point the feed material is fed into the furnace at a rate so as to melt it shortly after it reaches the arc. The tip of the electrode is kept as close to the accumulating mass of feed material as possible to keep a steady arc and to utilize as much heat as possible. In some cases, depending upon the feed material, it is preferable to insert the tip of the electrode into the top portion of the accumulated feed.

Control of the arc is usually by sound and sighting through smoked glasses. The electrode is moved by the operator in order to melt any feed not previously melted when dropped into the arc. An ammeter reading may be used to aid in controlling the quality of the arc; however, sight and sound are also very important. Experience with the particular furnace and feed material usually determines the optimum amperage flow for a particular run. Excessive feed flow and improper electrode position are the conditions which most often cause a fluctuating arc temperature.

Alternating or direct current can be used. It is easier to maintain a steady temperature when direct current is used, and better control of the arc is obtained when the graphite electrode is the cathode. It is important that the feed material be fed at a constant rate to the heating zone so as not to unduly lower the temperature of such zone, since substantially complete melting of the material is essential.

In the operation of the furnace, the cross-sectional area of the furnace increases as a result of the furnace wall flaking off and the diameter of the electrode decreases because of the action of the arc on it. It has been found desirable to increase the diameter of the electrode as the furnace cross-sectional area increases so as to maintain a high enough temperature to substantially melt all of the uranium compound fed into the arc. If, during the melting of any particular charge in the furnace, the temperature is allowed to fluctuate to a large extent, a stoichiometric density material is not formed.

The described process functions as a purification operation because it has been found that the temperature necessary to obtain a fused uranium dioxide is high enough to volatilize many of the contaminants in the fuel.

After a predetermined amount of feed has been fused the arc is continued for a short period of time in order to insure complete fusion. The heated mass is then transferred, as quickly as possible to diminish cooling in air, to a nonoxidizing cooling medium. Advisably, the hot mass of uranium dioxide is removed from the electric furnace immediately after the arc is terminated and rapidly cooled in water or in steam. In the case of water, it should be boiling so as to exclude most of the oxygen. A weak solution of ammonium hydroxide is useful in place of water since the ammonia is cracked at the surface of the molten mass and aids in reducing the formation of oxides higher than uranium dioxide. Any uranium carbides contained in the heated mass are converted to volatile hydrocarbons, and mostly acetylene, and oxides and hydroxides of uranium. In addition to water and steam, an inert atmosphere containing water vapor or some other constituent that will convert the uranium carbides can be used.

An alternative method is to place the hot mass, immediately after removal from the high temperature zone, into an atmosphere of carbon dioxide or some other inert atmosphere while such mass is being rapidly cooled. The uranium carbides are not completely converted into volatile hydrocarbons, and oxides and hydroxides of uranium in this way. Therefore, after the cooled mass is ground and washed, it is steamed to eliminate the uranium carbides. Without steaming, the conversion products that are not volatilized remain on the surface of the $UO_2$ particles. These products are not as dense as the fused $UO_2$ produced in the furnace, and therefore lower the overall density of the finished product unless steps are taken to remove them from the surface of the fused $UO_2$. The following table shows data to support this theory.

TABLE I

| Run No. | Cooling Technique | Specific Gravity of Ground and Washed $UO_2$ |
|---|---|---|
| 1 | Dry Ice | 10.52 |
| 2 | do | 10.49 |
| 3 | Steam | 10.97 |
| 4 | do | 10.95 |
| 5 | do | 10.97 |

A quantity of unfused feed material is removed from the furnace with the fused material depending upon the size of the fused mass. This unfused material is on the surface of the fused mass and is returned to the feeding hopper after it is separated in the washing step. While the material from the furnace is cooled in the water or in steam, a detectable odor is noticed. It is believed that any uranium carbide that was in the uranium compound comprising the feed, or was formed by the combination of uranium with free carbon from the walls of the furnace or from the graphite electrode, is, at this point, converted to hydrocarbons, low oxides or uranium hydroxides. When cooled, the mass is easily crushed with slight pressure into crystals of stoichiometric uranium dioxide having the lower density uranium oxides and hydroxide contaminants on the surface of said crystals. The contaminants are then washed out by use of a vibrating screen under water, a spray or other means. Any free carbon, unfused feed material, fines, and the aforementioned contaminants are then returned to the feed hopper.

The product is then dried. It is preferred to dry at between 60° C.–70° C. If desired, the material may be ground to any desired fineness. Care should be taken not to heat the uranium dioxide when grinding, otherwise the material oxidizes to higher oxides of uranium. If this is not possible, grinding should take place in an inert atmosphere.

The same procedure is followed when the molten mass is cooled in a nonoxidizing atmosphere where a reactant is not present which can convert the uranium carbides that were formed or were initially present, except that an additional step must be taken to convert such uranium carbides. This step consists of steaming the material after it has been ground to the desired particle size until there is no detectable odor coming off the exhaust steam. This steaming step converts the uranium carbides to the aforementioned gaseous hydrocarbon, oxides and hydroxides of uranium; however, such oxides and hydroxides must then be washed off the crystals of the stoichiometric $UO_2$.

It can readily be been that the best method is to cool the hot mass coming from the furnace and convert the carbides in one operation, such as cooling in the aforementioned boiling water or steam.

The following examples are presented to illustrate specific embodiments of the invention.

*Example 1*

In an electric furnace consisting of a cylinder of graphite, insulated so as to lose as little heat as possible to the surrounding atmosphere, a graphite rod, a water cooled hood and a feed tube through the hood, 109 pounds of ceramic grade uranium dioxide powder having a bulk density of approximately 2 g./cc. was carefully fed at a uniform rate into the area of an electric arc near the bottom of the furnace, for a period of four hours and 35 minutes. The amperage was kept at about 440 amperes and the voltage was kept at about 55 volts. After a quantity of about five pounds of uranium feed compound was fed into the furnace, the feeding was stopped and the arc continued for about 1–2 minutes or until the operator was satisfied that substantially all the feed had been melted. Furnace charges of approximately five pounds each were melted until 109 pounds were consumed. Upon removal from the furnace the fused oxide was rapidly cooled in boiling water at a depth about one half the height of the fused mass. The mass was then gently tapped and it broke into uranium dioxide crystals. This material was then screened on a 20 mesh vibrating screen under water. Any loose carbon from the furnace floated to the surface. Undersized fused material and the unfused feed material were dried and then returned to the feed hopper. This amounted to approximately 30.4% of the entire 109 pounds of feed, most of which was unfused $UO_2$. The finished product was stoichiometric and had a crystal density of 10.95 g./cc. or 99.82% of theoretical.

*Example 2*

Into the furnace described in Example 1 was fed 166 pounds of ceramic grade uranium dioxide having a bulk density of approximately 2 g./cc. during a 60-minute interval. The amperage was kept at about 330 amperes and the voltage at about 55 volts. The procedure followed was the same as in Example 1. The finished product was stoichiometric and had a density of 10.95 g./cc. The feed loss was slightly in excess of 1%. It is anticipated that in a larger operation this loss can be materially reduced. Because it takes a certain amount of heat to raise the temperature of the furnace it can be seen when comparing the output of the furnace in each example that the capacity is greatly increased in proportion to the additional amount of power used.

Various changes and modifications of the invention can be made and, to the extent that such variations incorporate the spirit of this invention, they are intended to be included within the scope of the appended claims.

What is claimed is:

1. A process for producing uranium dioxide comprising solidifying molten uranium dioxide which contains uranium carbide as an impurity by cooling with a fluid water containing medium which is nonoxidizing and inert thereto whereby the uranium dioxide is maintained in that oxygen-containing state, and reacting the said uranium carbide impurity with water to convert the uranium carbide to at least one substance selected from the group consisting of volatile hydrocarbons, oxides of uranium and hydroxides of uranium.

2. The process of claim 1 wherein the molten uranium dioxide is solidified by cooling with liquid water free of elemental oxygen and the uranium carbide impurity is reacted with the cooling water.

3. The process of claim 1 wherein the molten uranium dioxide is solidified by cooling with aqueous ammonium hydroxide and the uranium carbide impurity is reacted with water contained therein.

4. The process of claim 1 wherein the molten uranium dioxide is soldified by cooling in an atmosphere containing water in the form of water vapor.

5. The process of claim 1 wherein the uranium dioxide is washed after reacting the uranium carbide impurity with the water to remove the reaction products thereof.

6. The process of claim 5 wherein the solidified uranium dioxide is subdivided to produce particles of stoichiometric uranium dioxide which have the uranium carbide impurity on the surfaces thereof, the uranium carbide impurity is reacted with the water, and the particles of uranium dioxide are washed to remove the resultant reaction products.

7. The process of claim 6 wherein the uranium carbide is reacted with water in the form of steam, and then the particles of uranium dioxide are washed with water to remove the reaction products.

8. The process of claim 7 wherein the molten uranium dioxide is cooled in an inert atmosphere.

9. The process of claim 8 wherein the inert atmosphere is gaseous carbon dioxide.

10. The process for preparing uranium dioxide which comprises heating at least one compound of the group consisting of $UO_2$, $UO_3$, $U_3O_8$, $UO_4$ and uranium diuranate to an elevated temperature in an electric arc between a carbon electrode and the uranium compound to form molten uranium dioxide containing uranium carbide as an impurity and cooling the molten uranium dioxide in a fluid medium containing water which is inert to the molten uranium dioxide to maintain the uranium dioxide in that oxygen-containing state while converting the uranium carbide impurity to at least one substance selected from the group consisting of volatile hydrocarbons, oxides of uranium and hydroxides of uranium.

11. The process of claim 10 in which the fluid cooling medium is water free of elemental oxygen.

12. The process of claim 10 in which the fluid cooling medium is dilute aqueous ammonium hydroxide.

13. The process of claim 10 in which the fluid cooling medium includes water vapor.

14. The process for preparing uranium dioxide which comprises heating at least one compound of the group consisting of $UO_2$, $UO_3$, $U_3O_8$, $UO_4$ and uranium diuranate to an elevated temperature in an electric arc between a carbon electrode and the uranium compound to form molten uranium dioxide containing uranium carbide as an impurity, cooling the molten uranium dioxide in a water and elemental oxygen-free fluid medium which is inert to molten uranium dioxide, and steaming the cooled uranium dioxide to convert the uranium carbide impurities to volatile hydrocarbons, oxides of uranium and hydroxides of uranium.

References Cited by the Examiner

UNITED STATES PATENTS

| | | | |
|---|---|---|---|
| 1,224,013 | 4/1917 | Parsons | 23—14.5 |
| 1,274,794 | 8/1918 | Shoeld | 13—23 |
| 2,905,528 | 9/1959 | Johnson | 23—14.5 |
| 2,906,598 | 9/1959 | Googin | 23—14.5 |
| 3,129,055 | 4/1964 | Bel et al. | 23—355 |

FOREIGN PATENTS

| | | |
|---|---|---|
| 166,003 | 11/1955 | Australia. |
| 577,972 | 6/1959 | Canada. |
| 15,488 | 2/1897 | Great Britain. |
| 997,355 | 7/1965 | Great Britain. |

OTHER REFERENCES

Ceramic Bulletin, vol. 36, No. 3, 1957, p. 114 only.

Chemical & Process Engineering, July 1960, "Uranium Dioxide Fabrication," pp. 293 and 294.

Katz et al., "The Chemistry of Uranium," National Nuclear Energy Series, Part 1, 1st Edition, pp. 260–262, 303, 304, 308–311 (1951).

Pedregal et al., "Second U.N. Conference on Peaceful Uses of Atomic Energy," vol. 4, pp. 85–87.

CARL D. QUARFORTH, *Primary Examiner.*

REUBEN EPSTEIN, L. DEWAYNE RUTLEDGE,
*Examiners.*

H. E. BEHREND, *Assistant Examiner.*